Patented Oct. 6, 1931

1,825,736

UNITED STATES PATENT OFFICE

PAUL KLEIN, OF BUDAPEST, HUNGARY, AND ANDREW SZEGVARI, OF AKRON, OHIO, ASSIGNORS, BY MESNE ASSIGNMENTS, TO AMERICAN ANODE INC., A CORPORATION OF DELAWARE

METHOD FOR THE PRODUCTION OF RUBBER GOODS DIRECTLY FROM LATEX

No Drawing. Application filed May 29, 1926, Serial No. 112,677, and in Hungary May 30, 1925.

This invention relates to a method of producing rubber goods directly from latex.

It is possible to manufacture only goods of very small thickness from latex by simple dipping. In order to increase the thickness of such goods it has been proposed to use porous dipping moulds consisting for example of unglazed burnt earthenware and adapted by virtue of their water absorbing capacity to promote the agglomeration of the rubber on the surface of the mould. It has been further proposed (Ditmar, Chemiker Zeitung, of August 2nd, 1923) to mix directly into the latex such substances, as by virtue of their colloidal state, adsorb water, in order to increase the thickness of the rubber layer deposited on dipping, on the porous mould. This method is however attended by disadvantages, because the latex is very sensitive towards the admixed substances and because undesirable substances may be incorporated with the rubber.

The present invention provides a method which enables a rubber layer of considerable thickness to be deposited on dipping moulds consisting of porous or semi-permeable substances, without it being necessary to add to the latex substances increasing the agglomeration thereof.

The method of the present invention is based on the experience, that the rubber layer agglomerating on the surface of the depositing mould is permeable as long as it is not dried. According to the invention, the agents serving to increase the agglomeration are therefore not added directly to the latex, but are applied on that side of the semi-permeable mould which is opposite to the side in contact with the latex, so that these agents are able to act upon the rubber latex or upon the rubber deposited therefrom only through the substance of the semi-permeable depositing mould.

The term "semi-permeability" of the substance of the mould is intended to denote that the substance should allow the passage of water and the substances dissolved therein, but should intercept the passage of the dispersed rubber particles.

The agglomeration is increased either by promoting the migration of the water towards the inner side of the semi-permeable dipping mould, or by making available substances adapted to assist or to cause the agglomeration or coagulation of the rubber towards the rubber layer deposited on the semi-permeable mould, through the wall of said mould or through this rubber layer towards the latex layer in contact with the already deposited rubber layer. Both methods can however be combined if desired. The rate of withdrawal of the water through the wall of the dipping mould can be increased for example by accelerating the evaporation of the water at the side of the wall of the depositing moulds opposite to the latex or, in the case of hollow moulds, in the interior of these latter by heating or by the circulation of air, or by both means in conjunction, or by aspirating or by draining the water through the substance of the mould by keeping the interior of the mould at a lower pressure than the outside. It should be remarked that the filtration of the latex through semi-permeable substances could hitherto be accomplished only by adding protecting colloids to the latex, as otherwise the high vacuum required for the filtration of the water decreases the permeability, thereby preventing the continuation of the filtration.

We have however found that in applying a very slight under-pressure, it is possible to cause the water permanently to ooze through the substance of the mould and through the rubber deposited thereon.

The under-pressure in the inner of the mould can be produced not only by suction, but also by external pressure.

The withdrawal of water can be also promoted by water-absorbing substances, introduced into the interior of the mould. These substances may be of such a nature that they form with the absorbed water insoluble products, for example gypsum, cement, or soluble products adapted to diffuse through the substance of the mould towards the rubber deposit, or even into this latter or into the latex, whilst being indifferent towards the rubber. Substances may be also introduced into the interior of the mould which do not absorb water, but which, by diffusion through the substance of the mould may be adapted to promote the agglomeration or coagulation of the rubber on the mould. Such substances are for example acetic acid, or other acids. Substances can be further used, which act both by absorbing water and by solutions they form with the absorbed water promoting by their diffusion through the substance of the mould the agglomeration or coagulation of rubber. Such agents are for example calcium chloride or zinc chloride. These soluble water-absorbing or coagulating substances may also be employed in concentrated solutions, which can be filled into or circulated through the interior of the moulds.

In the use of coagulating substances adapted to diffuse into the rubber latex through the wall of the mould, the water absorbing capacity of the mould substance can be disregarded and moulds impregnated with liquid can be dipped into the rubber latex. This latter method has the advantage that the moulds need not be dried and that the danger of the pores of the mould becoming obstructed is decreased.

Rubber latex mixed with the usual conditioning substances, that is to say with vulcanizing agents, accelerators, dyes or filling substances can of course be worked up according to this invention, instead of pure rubber latex.

If rubber latex mixed with conditioning agents is used for dipping, a rubber layer of greater thickness is produced in the same time, than with pure latex. This effect is strange, because even in using conditioning substances, having no water-absorbing properties, the increase in thickness is considerably greater than would correspond to the increase of concentration due to the admixture of the conditioning substances.

Instead of pure rubber latex it is advisable to use a latex, which has been concentrated by the withdrawal of water, for example by centrifuging, especially if conditioning substances are added to the latex, because on the one hand in order to attain a rubber layer of a certain thickness on the dipping moulds, a smaller quantity of water must be withdrawn from a latex of greater concentration and on the other hand during a manipulation requiring a greater length of time, the conditioning substances dispersed in a denser rubber latex remain for a longer time in an even dispersion, than in a more diluted rubber latex.

The term "aqueous dispersion of rubber" as employed in the claims hereof is intended to include such dispersions in any degree of concentration and whether or not containing conditioning substances, such as vulcanizing agents, accelerators, dyes or filling substances.

Having now fully described and ascertained the said invention and the manner in which it is to be performed, we declare, that what we claim is:—

1. The method of producing rubber goods directly from aqueous dispersions of rubber which comprises associating with a mold a substance capable of agglomerating rubber particles of the dispersion, and immersing the mold in the aqueous rubber dispersion for such time as to permit some of the agglomerating substance to diffuse into the dispersion to form about the mold a coherent layer of deposited rubber.

2. The method of producing rubber goods directly from aqueous dispersions of rubber which comprises associating with a semi-permeable mold a substance capable of agglomerating rubber particles of the dispersion, and immersing the treated mold in the rubber dispersion for such time as to permit a diffusion of at least a part of the agglomerating substance out into the dispersion to form about the mold a coherent layer of deposited rubber.

3. The method of producing rubber goods directly from aqueous dispersions of rubber which comprises associating with a semi-permeable mold a substance capable of agglomerating rubber particles of the dispersion, immersing the treated mold in the rubber dispersion for such time as to permit a diffusion of at least a part of the agglomerating substance out into the dispersion to form about the mold a coherent layer of deposited rubber and causing some of the liquids of the dispersion to be withdrawn therefrom into the semi-permeable mold.

4. The method of producing rubber goods directly from aqueous dispersions of rubber which comprises impregnating at least in part a semi-permeable mold with a substance capable of agglomerating rubber particles of the dispersion, and immersing the mold in the aqueous rubber dispersion for such time as to permit some of the agglomerating substance to diffuse into the dispersion to form about the mold a coherent layer of deposited rubber.

5. The method of producing rubber goods directly from aqueous dispersions of rubber which comprises soaking a semi-permeable mold with a liquid capable of agglomerating rubber particles of the dispersion, and immersing the treated mold in the rubber dispersion for such time as to permit the formation about the mold of a coherent layer of deposited rubber.

6. The method of producing rubber goods directly from aqueous dispersions of rubber which comprises placing in a hollow semi-permeable mold a substance capable of agglomerating rubber particles of an aqueous rubber dispersion and immersing the treated mold in the rubber dispersion for such time as to permit a diffusion of at least a part of the agglomerating substance out into the dispersion.

7. The method of producing rubber goods directly from aqueous dispersions of rubber which comprises associating with a semi-permeable mold a substance capable of agglomerating rubber particles of an aqueous rubber dispersion, immersing the mold in the rubber dispersion, and accelerating the natural migration of liquids from the rubber dispersion into the mold.

8. The method of producing rubber goods directly from aqueous dispersions of rubber which comprises associating with a semi-permeable mold a substance capable of agglomerating rubber particles of an aqueous rubber dispersion, immersing the mold in the rubber dispersion, accelerating the natural migration of liquids from the rubber dispersion into the mold and removing at least in part the liquid from the mold.

9. The method of producing rubber goods directly from aqueous dispersions of rubber which comprises associating with a semi-permeable mold a substance capable of agglomerating rubber particles of an aqueous rubber dispersion, immersing the mold in the rubber dispersion, accelerating the natural migration of liquids from the rubber dispersion into the mold and removing at least in part the liquid from the mold by application of heat to the mold.

10. The method of producing rubber goods directly from aqueous dispersions of rubber which comprises immersing a mold embodying a substance capable of agglomerating rubber particles of an aqueous dispersion in such a dispersion for a time sufficient to permit some of the agglomerating substance to diffuse into the dispersion to form about the mold a coherent layer of deposited rubber.

11. The method of producing rubber goods directly from aqueous dispersions of rubber which comprises immersing a semi-permeable walled mold embodying a substance capable of agglomerating ruuber particles of an aqueous rubber dispersion in such a dispersion with one side only of said wall in contact with the dispersion.

12. The method of producing rubber goods directly from aqueous dispersions of rubber which comprises immersing a semi-permeable walled mold embodying a substance capable of coagulating the dispersed particles of an aqueous rubber dispersion in an aqueous dispersion of rubber with one side only of said wall in contact with the dispersion, and facilitating the diffusion of the liquids of the dispersion through said wall by imposing a slightly lower pressure at the side of the wall out of contact with the dispersion than the pressure at the side in contact with the dispersion, but not a sufficient pressure to form of the deposited rubber a water impermeable layer.

13. The method of producing rubber goods directly from aqueous dispersons of rubber which comprises immersing a semi-permeable walled mold in an aqueous dispersion of rubber with one side only of said wall in contact with the dispersion, facilitating the passage of liquids of the dispersion through said wall by imposing a slightly lower pressure at the side of the wall out of contact with the dispersion than the pressure at the side in contact with the dispersions, but not a sufficient pressure to form of the deposited rubber a water impermeable layer.

14. The method of producing rubber goods directly from aqueous dispersions of rubber which comprises immersing a semi-permeable walled mold embodying a substance capable of agglomerating rubber particles of an aqueous rubber dispersion in such a dispersion with one side only of said wall in contact with the dispersion and removing from the other side of said wall liquids diffusing through said wall.

15. The method of producing rubber goods directly from aqueous dispersions of rubber which comprises immersing in an aqueous rubber dispersion a hollow mold embodying in its wall structure a substance capable of diffusing into the dispersion and of coagulating rubber particles of the dispersion at the surface of the mold, and facilitating such action by heat applied interiorly of the mold.

16. The method of producing a rubber article from an aqueous dispersion of rubber which comprises building up a coherent layer of rubber in the general shape of the article by immersing in an aqueous dispersion of rubber a form having the general shape of the article and embodying a substance capable of coagulating rubber particles of the dispersion at the surface of the mold.

17. The method of producing a rubber article from an aqueous dispersion of rubber which comprises building up a coherent layer of rubber in the general shape of the article by immersing in an aqueous dispersion of rubber a form having the general shape of the article and embodying a substance capable of coagulating rubber particles of the dispersion at the surface of the mold and facilitating such building-up action by heat applied to the mold.

18. The method of producing rubber goods directly from aqueous dispersions of rubber which comprises associating with a mold a metal salt capable of agglomerating rubber particles of such dispersions, and immersing the mold in the aqueous rubber dispersion for such time as to permit some of the agglomerating substance to diffuse into the dispersion to form about the mold a coherent layer of deposited rubber.

19. The method of producing rubber goods directly from aqueous dispersions of rubber which comprises associating with a mold a zinc salt capable of agglomerating rubber particles of such a dispersion, and immersing the mold in the aqueous rubber dispersion for such time as to permit some of the agglomerating substance to diffuse into the dispersion to form about the mold a coherent layer of deposited rubber.

20. The method of producing rubber goods directly from aqueous dispersions of rubber which comprises associating with a mold a zinc salt capable of agglomerating rubber particles of such a dispersion, and immersing the mold in an aqueous dispersion comprising rubber, a vulcanizing agent, and an accelerator for such time as to permit some of the agglomerating substance to diffuse into the dispersion to form about the mold a coherent layer of deposited vulcanizable rubber.

21. The method of producing rubber goods directly from aqueous dispersions of rubber which comprises causing the local coagulation of an aqueous dispersion of rubber on the surface of a mold, the coagulation being aided by heat applied to the mold.

In testimony whereof we affix our signatures.

PAUL KLEIN.
ANDREW SZEGVARI.